May 18, 1954 M. LOEB 2,678,833
MEMORANDUM PAD HOLDER
Filed April 28, 1952
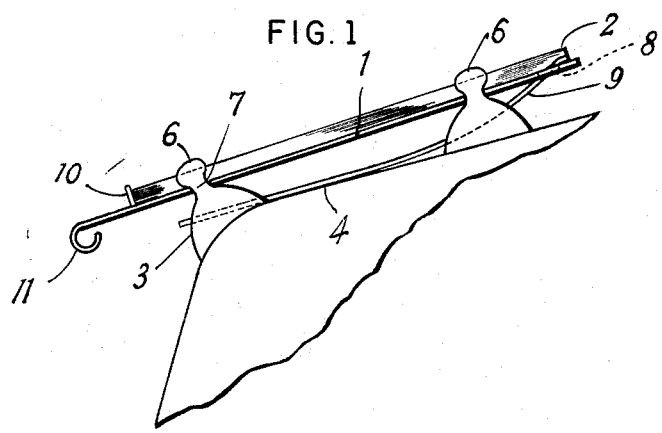
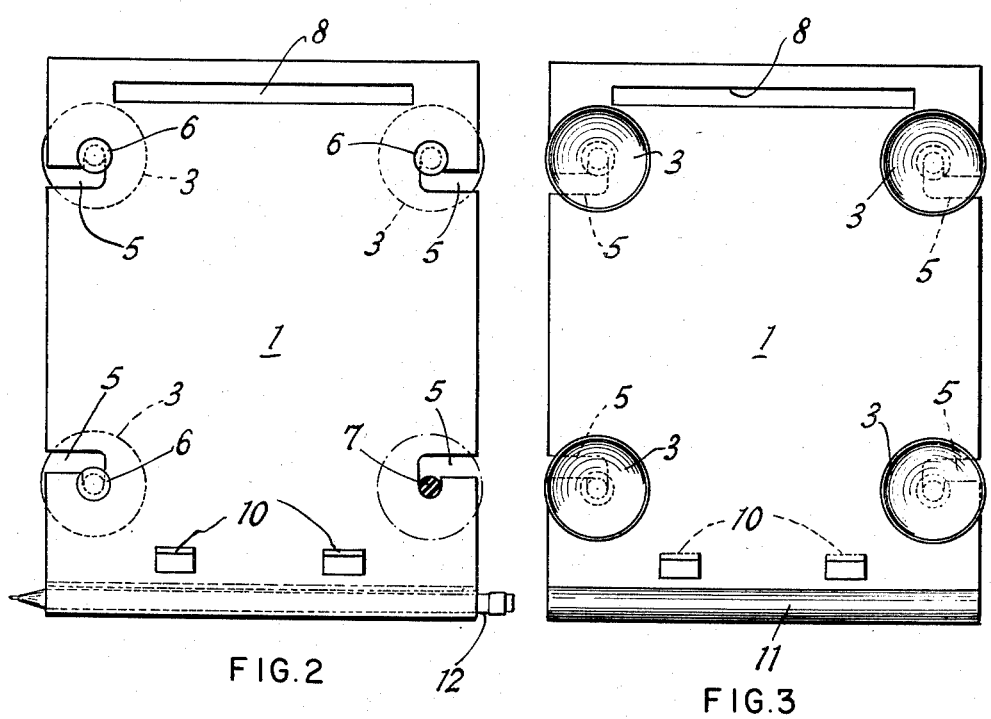
INVENTOR.
Morris Loeb
BY
William F. Nickel
ATTORNEY

Patented May 18, 1954

2,678,833

UNITED STATES PATENT OFFICE 2,678,833

MEMORANDUM PAD HOLDER

Morris Loeb, New York, N. Y.

Application April 28, 1952, Serial No. 284,755

2 Claims. (Cl. 281—15)

My invention is an improved holder for a memorandum pad to be mounted in an automobile near one of the seats or elsewhere on any suitable support.

An important object of this invention is to provide a holding device that can be readily attached to a support having either a flat or a curved surface and retained firmly in place thereon.

Another object is to provide a holder that in its preferred form can be quickly secured to a support without requiring clips, screws, or other mechanical fastening means, to dispose the holder and pad within easy reach for use whenever it is needed.

A further object is to provide a holding member having fastening means for uniting it to a support and keeping it in position, and adapted to carry a memorandum pad and to engage the pad in such wise that separation thereof from the holder is effectually prevented.

In its preferred form the holder comprises a plate or panel on which the pad rests, and one or more fasteners, such as vacuum cups or magnetic members that are connected to the plate to engage the support; said means also having projections adjacent the pad so that it cannot be moved far enough sidewise on the panel to be displaced therefrom.

The nature and advantages of this invention are clearly and at length set forth in the ensuing description and the novel features are defined in the claims. On the drawings the construction of the holder is fully illustrated but I do not wish to be limited to what is actually shown herein; for variations in structural details may be adopted without real changes or omission of any of the characteristics which are essential parts of the device.

On said drawings:

Figure 1 is a side view of my improved holder set up on a support for it, with fasteners therefor.

Figure 2 is a top view thereof, and

Figure 3 is a bottom plan of the same.

The holding device includes a flat plate or panel 1 on which rests the pad 2. To the panel 1 are adjustably connected several vacuum cups 3 which grip the surface of a support 4. Because of the adjustability of the fastening devices 3, the holder can be mounted on a flat or plane surface, such as a desk or table, or a curved surface, such as may be found inside an automobile behind the windshield and along the top of instrument panel. The cups 3, which are flexible and preferably made of rubber, incline themselves according to the formation of the surface, whether flat or curved, and grip it tightly. The holder is thus a very useful and handy accessory in the cars of salesmen and others who have to travel about and jot down notes from time to time relating to things that must later be given full consideration.

The plate 1 can be of metal or other material and is rectangular or otherwise shaped. At each side are L-shaped or bayonet slots 5 opening through the edges of the panel 1, and while four such slots and four vacuum cup fasteners are shown, a different number may of course be utilized. The cups 3 have beads or knobs 6 connected to the cups by necks 7; and the cups are movably joined to the panel by slipping the necks 7 into the slots 5 which they fit snugly. The inner portions or halves of these slots are parallel to the edges of the plate 1, or transverse to the outer halves thereof, which are open at said edges, so that when the necks are slipped into the slots to the inner ends and the cups are affixed to the surface, no lengthwise or sidewise movement of the panel is permitted and the holder is maintained in the position required.

Near the upper edge the panel 1 has a long transverse slot 8, and the pad is disposed on the panel by slipping the stiff back 9 of cardboard on which the paper sheets are piled, through the slot so that the layer 9 is between the plate 1 and support 4, as indicated in Figure 1. Near the opposite edge the plate may have cut and bent up projections 10. The pad is thus surrounded and confined on the panel by the heads 6 on the cups 3 and the projections 10, as well as the back 9. Even if the back 9 becomes detached the pad is not likely to be displaced and pushed edgewise off the panel, especially if the holder is inclined with the slot 8 at the upper end, as Figure 1 shows it.

The edge of the pad opposite the slot 8 can be curled under as shown at 11 to serve as a channelled seat for a pencil or fountain pen 12; or if desired, the writing implement 12 can be thrust under the panel 1 and the seat 11 omitted. The curled under portion of the plate is smooth, and the hand of the writer may bear thereon when notes are made on the pad, without discomfort.

The holder is thus of simple design and inexpensive to produce. It is well calculated to serve its purpose; and both the holder and the pad and pencil it carries remain permanently accessible for repeated use.

The holder can be mounted on the panel board of an automobile or a desk, table or wall or any other support having a curved or plane surface. No tools are needed to mount it and it can be easily removed and set up at another point elsewhere, as may be desired.

Having described my invention, what I believe to be new is:

1. A holder comprising a flat panel for a memorandum pad of superposed sheets and a rigid back, the panel having a transverse slot adjacent one end through which the back is inserted to lie beneath the panel, and fastening means to attach the panel to a support, said means being adjustably connected to the panel adjacent each end and opposite side edges thereof and having projections on the top face of the panel, the projections at one side edge being farther from the projections on the opposite side edge than the length of said slot, said panel having additional projections adjacent the end remote from said slot.

2. A holder for a memorandum pad with a stiff back comprising a flat panel having L-shaped slots extending inward adjacent each side from its opposite edges and then parallel to said edges and flexible vacuum cups below the panel having necks in said slots and heads on said necks above said panel, the holder having a slot in the panel at one end for the insertion of said back to be below the panel, said last-named slot being shorter than the space between said L-shaped slots at the opposite side edges, the cups being movably connected to the panel for engagement with either a plane or a curved surface.

References Cited in the file of this patent

UNITED STATES PATENTS

| Number | Name | Date |
|---|---|---|
| 380,309 | Berliner | Apr. 3, 1888 |
| 2,193,991 | Treacy | Mar. 19, 1940 |
| 2,573,176 | Blackstone | Oct. 30, 1951 |

FOREIGN PATENTS

| Number | Country | Date |
|---|---|---|
| 620,571 | France | Jan. 22, 1927 |
| 531,135 | Germany | Aug. 7, 1931 |
| 959,182 | France | Sept. 21, 1949 |